UNITED STATES PATENT OFFICE.

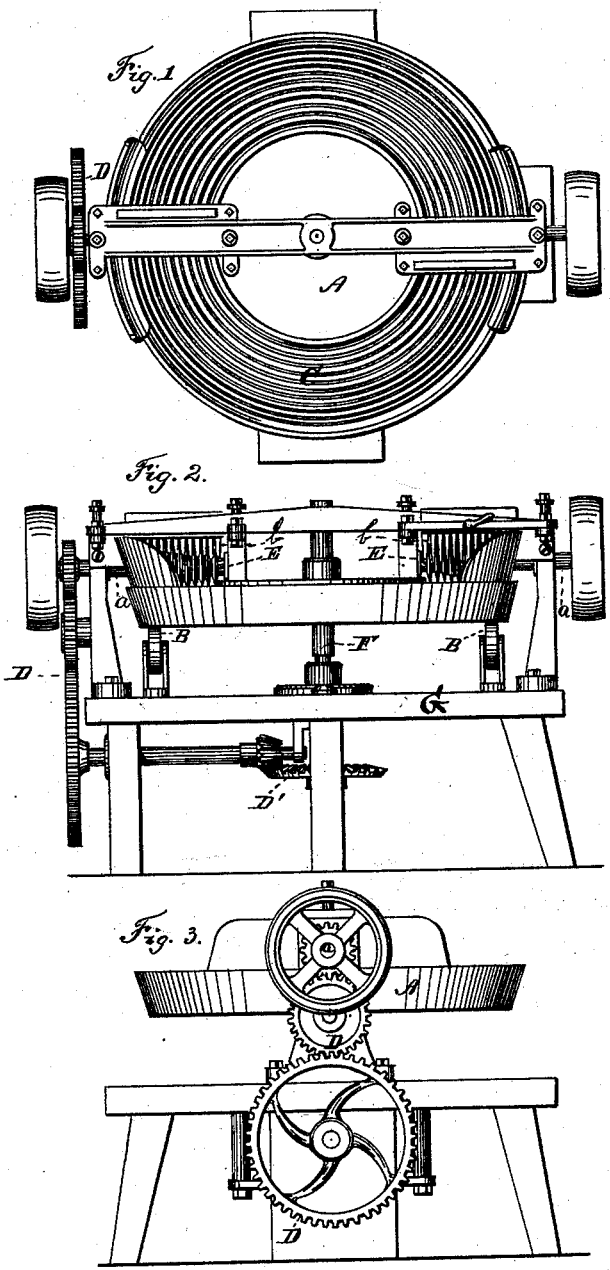

CHARLES SCHILLER, OF BALTIMORE, MARYLAND.

IMPROVEMENT IN MEAT-CUTTING MACHINES.

Specification forming part of Letters Patent No. 203,201, dated April 30, 1878; application filed February 7, 1878.

*To all whom it may concern:*

Be it known that I, CHARLES SCHILLER, of the city of Baltimore, in the county of Baltimore and State of Maryland, have invented certain new and useful Improvements in Iron-Plate Meat-Cutting Machines; and I do hereby declare that the following is a full, clear, and exact description thereof, which will enable others skilled in the art to which it appertains to make and use the same, reference being had to the accompanying drawings, and to letters of reference marked thereon, which form a part of this specification.

The nature of my invention consists in the construction and arrangement of a meat-chopping machine, as will be hereinafter more fully set forth.

In the annexed drawings, Figure 1 is a plan view of my meat-chopping machine. Fig. 2 is a front elevation, and Fig. 3 is a side elevation, of the same.

A represents a circular cast-iron bed-plate, secured upon an upright center-shaft, F, and moving upon rollers B B, which are mounted in suitable bearings on a frame, G.

The upper surface of the cast-iron plate is provided with a series of concentric grooves, C, which grooves are filled with strips of hard wood, properly glued, so that the surface of the plate will be perfectly smooth.

In a suitable frame-work erected on the main frame are placed two or more horizontal shafts, *a a*, upon each of which are secured a number of circular knives or cutters, E E, which correspond in number and position with the wood-filled grooves of the plate A. These knives or cutters are graduated in size, so that the knife nearest the center will be the smallest, and then gradually increase in diameter to the outer end of the shaft, so as to correspond in circumference with the length of the track on which the knives move on the bed, the bed-plate being made conical to correspond with the inclination of the lower edges of the series of knives.

The bed-plate A is rotated at a lesser rate of speed than the knives by means of gearing D, substantially as shown, or arranged in any other suitable or convenient manner.

Between the knives are placed clearers or clearing-arms *b b*, as shown, to prevent the knives from clogging.

The wooden strips inserted in the grooves on the cast-iron bed-plate prevent the knives from coming in contact with the iron, and when said strips are worn out they can be easily replaced by new ones at but a trifling cost.

I am aware that meat-choppers having a rotating bed, with one or more series of rotating knives, are not new, and I do not claim such, broadly, as my invention.

Having thus fully described my invention, what I claim as new, and desire to secure by Letters Patent, is—

As an improvement upon the class of meat-choppers in which a rotating bed and one or more series of rotating knives are used, the circular cast-iron bed-plate A, cast with a series of concentric grooves, C, in its upper face, filled with strips of hard wood, in combination with one or more series of graduated circular knives, corresponding in number and location with the wood-filled grooves of the bed-plate, as and for the purposes herein set forth.

In testimony that I claim the foregoing as my own I affix my signature in presence of two witnesses.

C. SCHILLER.

Witnesses:
H. LAUTEN,
MARTIN TANNER.